US011156209B2

(12) United States Patent
    Ziems et al.

(10) Patent No.: US 11,156,209 B2
(45) Date of Patent: Oct. 26, 2021

(54) GENERATOR ROTOR AND GENERATOR STATOR AND GENERATOR AND WIND POWER PLANT HAVING SAME AND METHOD FOR TRANSPORTING A GENERATOR

(71) Applicant: WOBBEN PROPERTIES GMBH, Aurich (DE)

(72) Inventors: Jan Carsten Ziems, Aurich (DE); Wojciech Giengiel, Aurich (DE); Mats Volles, Aurich (DE); Michael Freese, Aurich (DE); Wilko Gudewer, Norden (DE); Jan-Phillip Köhler, Ihlow (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/640,709

(22) PCT Filed: Aug. 24, 2018

(86) PCT No.: PCT/EP2018/072877
    § 371 (c)(1),
    (2) Date: Feb. 20, 2020

(87) PCT Pub. No.: WO2019/038421
    PCT Pub. Date: Feb. 28, 2019

(65) Prior Publication Data
    US 2020/0182222 A1   Jun. 11, 2020

(30) Foreign Application Priority Data

Aug. 25, 2017  (DE) .................... 10 2017 119 530.0

(51) Int. Cl.
    *H02K 7/102*   (2006.01)
    *H02K 7/18*    (2006.01)
    (Continued)

(52) U.S. Cl.
    CPC ............... *F03D 9/25* (2016.05); *H02K 7/088* (2013.01); *H02K 7/102* (2013.01); *H02K 7/1838* (2013.01); *H02K 2201/15* (2013.01)

(58) Field of Classification Search
    CPC .......... F03D 9/25; H02K 7/088; H02K 7/102; H02K 7/1838; H02K 2201/15;
    (Continued)

(56) References Cited

U.S. PATENT DOCUMENTS

| 6,628,034 B2 * | 9/2003 | Jang ........................ H02K 21/16 310/179 |
| 9,631,607 B2 | 4/2017 | Gudewer |

(Continued)

FOREIGN PATENT DOCUMENTS

| CA | 2 773 243 A1 | 3/2011 |
| CN | 104054238 A | 9/2014 |

(Continued)

OTHER PUBLICATIONS

Machine Translation, Hartmann, EP-2924847-A1, Sep. 2015. (Year: 2015).*

*Primary Examiner* — Thomas Truong
(74) *Attorney, Agent, or Firm* — Seed Intellectual Property Law Group LLP

(57) ABSTRACT

A generator rotor for a wind power plant, wherein the generator rotor has at least one dividing plane for dividing the generator rotor into at least two segments. The dividing planes extend in the generator rotor along asymmetrical section lines of the generator rotor. A generator stator for a wind power plant, a generator of a wind power plant, and a wind power plant and a method for transporting a generator.

14 Claims, 5 Drawing Sheets

(51) Int. Cl.
*F03D 9/25* (2016.01)
*H02K 7/08* (2006.01)

(58) Field of Classification Search
CPC ........... H02K 2213/03; H02K 2213/12; H02K 19/22; H02K 3/28; H02K 15/0006; H02K 7/18; H02K 1/12; H02K 1/22; H02K 15/00; Y02E 10/72
See application file for complete search history.

(56) References Cited

U.S. PATENT DOCUMENTS

| | | | |
|---|---|---|---|
| 9,653,977 | B2 | 5/2017 | Gudewer et al. |
| 9,923,422 | B2 | 3/2018 | Cortada Acosta |
| 10,355,539 | B2 | 7/2019 | Hartmann et al. |
| 2012/0217831 | A1 | 8/2012 | Jore et al. |
| 2013/0200630 | A1* | 8/2013 | Sharples ................ H02K 7/088 290/55 |
| 2015/0288267 | A1* | 10/2015 | Gudewer ................ H02K 1/22 290/55 |
| 2016/0336834 | A1 | 11/2016 | Diedrichs |
| 2018/0198349 | A1 | 7/2018 | Sartorius |
| 2018/0375407 | A1 | 12/2018 | Sartorius |

FOREIGN PATENT DOCUMENTS

| | | | | |
|---|---|---|---|---|
| CN | 104396125 A | 3/2015 | | |
| DE | 102012202735 A1 | 8/2013 | | |
| DE | 102012208547 A1 | 11/2013 | | |
| DE | 102015212453 A1 | 1/2017 | | |
| EP | 2621056 A1 | 7/2013 | | |
| EP | 2924847 A1 | * 9/2015 | ............... | F03D 9/25 |
| EP | 2924847 A1 | 9/2015 | | |
| JP | H0620355 A | 1/1994 | | |
| JP | 2011217444 A | 10/2011 | | |
| JP | 2012205334 A | 10/2012 | | |
| JP | 2015521022 A | 7/2015 | | |
| JP | 2015523044 A | 8/2015 | | |
| RU | 2506682 C2 | 2/2014 | | |
| WO | 2017/001349 A1 | 1/2017 | | |

* cited by examiner

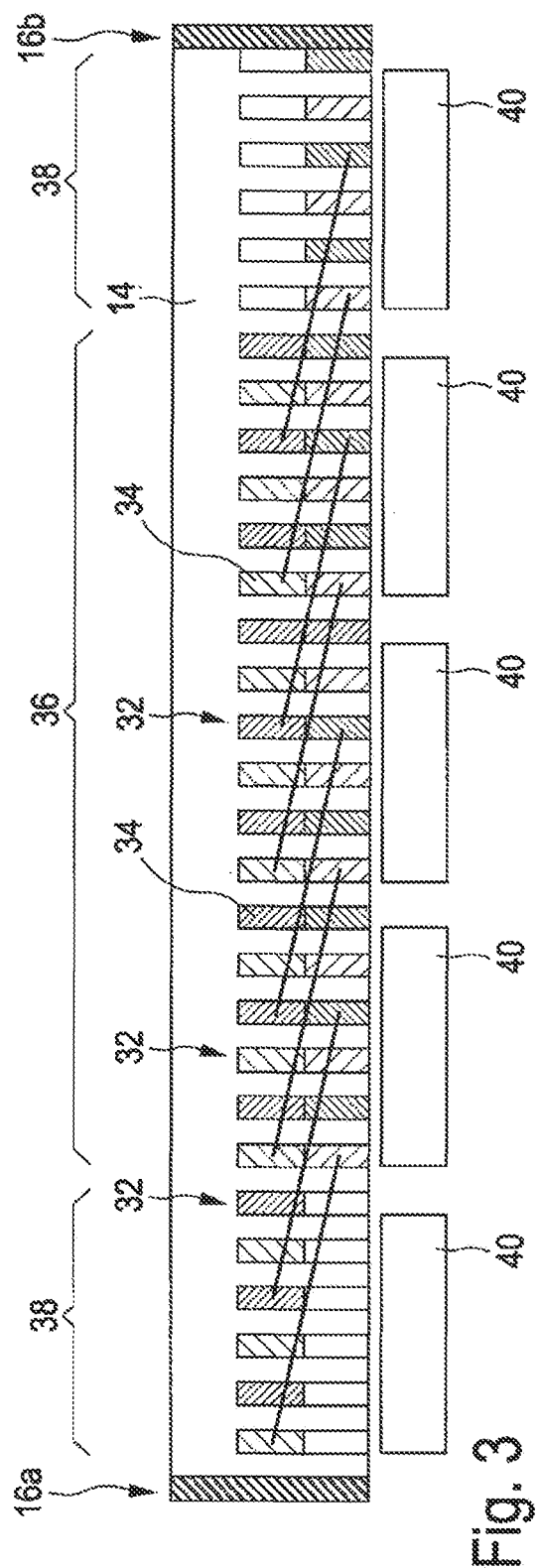
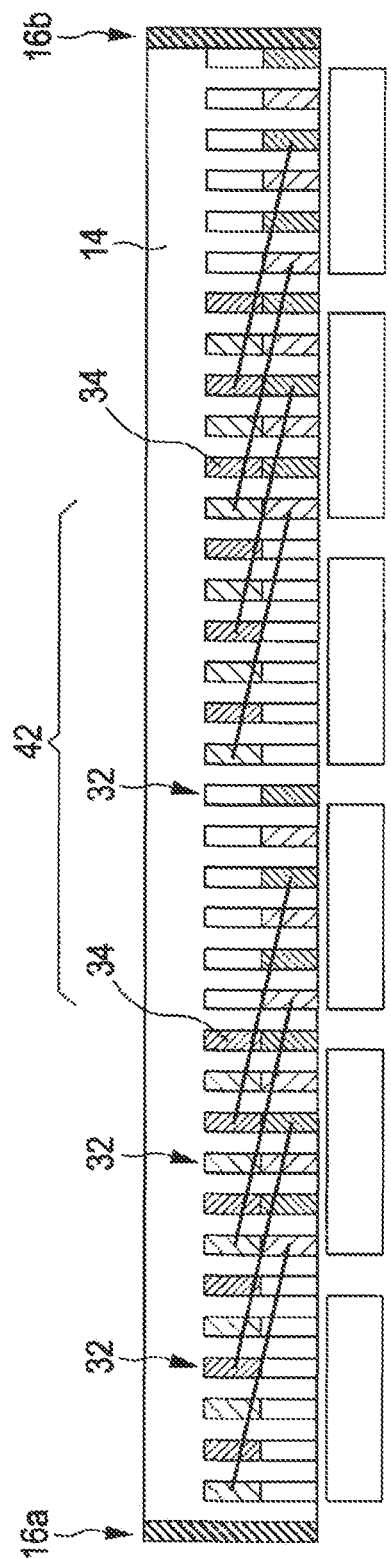
Fig. 3
Fig. 4

GENERATOR ROTOR AND GENERATOR STATOR AND GENERATOR AND WIND POWER PLANT HAVING SAME AND METHOD FOR TRANSPORTING A GENERATOR

BACKGROUND

Technical Field

The invention concerns a generator rotor and a generator stator of a generator of a wind power plant. The generator rotor together with the generator stator in the generator are set in motion driven by an aerodynamic rotor, and thus generate electrical energy from the wind. The invention furthermore concerns a method for transporting such a generator.

Description of the Related Art

Wind power plants, in particular horizontal axis wind turbines, which have no gear mechanism are known from the prior art. In these wind power plants, an aerodynamic rotor drives the generator rotor of the generator directly, so that the generator converts the kinetic energy extracted from the wind into electrical energy. The rotor of the generator thus turns as slowly as the aerodynamic rotor. To take account of such a slow rotation speed, the generator has a large generator diameter relative to the nominal power, in particular a large air gap diameter. Thus despite the slow rotation speed, a relatively large differential speed can be achieved between the rotor and stator of the generator in the region of the air gap. Modern wind power plants have nominal power levels of several megawatts, so that these require air gap diameters of far more than 5 meters.

The problem arising here is that of transporting such a generator to the erection site of the wind power plant. In many countries, the maximum width that may and can be transported by road is around 5 meters. This means that the maximum diameter of the generator during transport must not exceed 5 meters if the generator is transported horizontally, i.e., with a rotation axis perpendicular to the road. The diameter of a generator is thereby restricted.

In order to solve this transport problem for generators with an air gap diameter of more than 5 meters, it has therefore been proposed in the prior art to break down the generator, or at least the generator stator and/or generator rotor, into parts of equal size and only assemble these at the erection site. Here for example, it is proposed to divide the generator rotor or generator stator into two halves or four quarters, wherein these parts are then each narrower than 5 meters and hence can be transported by road without problems.

Dividing the generator for transport is necessary since, after production, the generator is usually fully assembled on a test bench and its function checked. Here, in particular moving parts are finely adjusted in order to guarantee smooth running of the generator. After the trial run or test run of the generator, this is then—as already explained above—divided into halves, quarters or smaller elements in order to bring the generator to the erection site. These halves or quarters are re-assembled at the erection site.

The disadvantage here is that a degree of play in the region of the connecting points cannot be fully excluded, and therefore mounting of the generator on reassembly thereof can lead to the generator behaving differently in operation, in particular running more unevenly, than previously on the test bench. In particular, the effort involved in dismantling and assembling the generator is very high.

In the priority application of the present application, the German Patent and Trademark Office researched the following prior art: DE 10 2012 208 547 A1 and DE 10 2015 212 453 A1.

BRIEF SUMMARY

Proposed is a technique which allows a generator with an air gap diameter of more than 5 meters to be transported with minimum effort.

For this, provided is a generator rotor for a wind power plant. The generator rotor has at least one dividing plane for dividing the generator rotor—also referred to in brief as the rotor—into at least two segments. The dividing plane extends through the rotor along asymmetrical section lines of the rotor. This means that the rotor can be divided into segments by the dividing planes, wherein at least two segments have different shapes and dimensions from each other.

If the generator rotor is considered as a circular element, symmetrical section lines would correspond to lines which run from a point on the outer radius of the generator rotor through the center point to the opposite outer end on the radius of the generator rotor. Asymmetrical section lines of the rotor accordingly do not run straight through the center or middle point, but run eccentrically. The dividing planes accordingly extend along the asymmetrical section lines and divide the circular element, formed by the rotor, into at least two segments which are not precisely halves, quarters or other sizes of circle sectors, also called circle segments.

This arrangement of dividing planes allows the provision of dividing planes of maximum length, i.e., with a long circle chord, which comprise a continuously arranged number of connecting elements, for example bolting points, whereby play on assembly of the generator rotor at the erection site is reduced. In particular, it is therefore possible firstly to divide the generator rotor into several segments for transport, and then reassemble it with great precision at the erection point. Irregularities or other behavior compared with behavior in a test bench are thereby largely reduced.

According to a first embodiment, the generator rotor comprises a first segment. The first segment has an opening for a bearing which is delimited circumferentially by the first segment. The generator rotor as a whole therefore has the form of a circular ring. Accordingly, through this opening a bearing can be connected to the first segment and undergo a trial run on the test bench with the generator rotor. This bearing need not be removed again for transport but may remain connected to the first segment, since the dividing planes do not run through this opening. Tolerances in the alignment of the bearing on the generator rotor, which lead to the generator having different behavior at the erection site from on the test bench, are thereby avoided.

According to one embodiment, the length of a dividing plane is longer than the width, i.e., the difference between the outer and inner diameter of the rotor.

According to one embodiment, connecting elements are evenly distributed over the length of the dividing plane.

According to a further embodiment, the dividing plane runs parallel to a tangent of the rotor, preferably centrally between two parallel tangents on the outer diameter and inner diameter of the rotor. In this way, the play of the connecting elements of the segments is averaged out further, so that tolerances can be reduced.

According to a further embodiment, the opening in the first segment has a circumferential circular ring. The circular ring is or can be connected to a bearing for rotatable mounting of the rotor on a rotor axis. The circular ring is also part of the first segment.

By provision of a circular ring in the first segment, the first segment is thus designed for connection to a bearing so that the bearing and first segment form an integral unit which need not be separated again after a trial run. Fine adjustments performed during a trial run or test run, in particular with regard to possible tolerances of the connecting elements between the bearing and the first segment, are therefore fully retained also for later operation.

According to a further embodiment, the first segment has an annular region which is arranged parallel to the rotational plane of the rotor. The annular region comprises a braking surface for braking the rotor and/or one or more locking recesses for locking the rotor. Thanks to the annular region arranged on the first segment for braking and/or locking the rotor, it is not necessary to provide further regions for braking and/or locking on the further segments which are different from the first segment, so no transitions between locking or braking regions occur at dividing planes, which would otherwise have to be taken into account on alignment of the segments at the erection site.

According to a further embodiment, at least one segment has the contour of a circle segment. A circle segment is the partial area of a circle area delimited by an arc and a chord. Preferably therefore, at least one circle segment of a generator rotor having a generator with an air gap diameter of more than 5 meters may be easily dismantled again for transport after complete assembly and performance of a test run. Such a circle segment can later be connected to the remaining part of the generator rotor relatively precisely at the erection site, so that despite tolerances, a substantially precise, identical structure of the generator motor is possible at the erection site in comparison with the test bench. All parts already mounted on the generator rotor, such as for example the bearing, may remain mounted on the rotor for transport.

In particular therefore, rapid dismantling after the test run is possible, and rapid assembly at the erection site.

According to a further preferred embodiment, the rotor has two dividing planes which run parallel with each other. The rotor can be divided by the two dividing planes into three segments, wherein two of the segments each have a contour of a circle segment and at the side adjoin a segment which preferably corresponds to the first segment of one of the above-mentioned embodiments.

Thus a generator rotor with a diameter of more than 5 meters can easily be prepared for transport in very short time simply by separating the generator rotor in the region of the dividing planes. At the erection site, rapid reassembly is possible.

According to a further embodiment, the generator rotor has a diameter of more than 6 meters, preferably more than 7 meters, in particular substantially 7.5 meters. All segments at least in one dimension are each equal to or narrower than 5 meters. Such a generator rotor can guarantee a slow, gentle rotation speed of the wind power plant with simultaneously large differential speed between the generator rotor and generator stator in order to produce a nominal power of several megawatts, wherein such generator rotors can be transported on public roads because of the arrangement of the dividing planes.

According to a further embodiment, the rotor is an internal rotor and, additionally or alternatively, the generator rotor is an externally excited generator rotor.

Provided is a stator for a wind power plant. The stator has circumferentially adjacent grooves. Also, at least two separating points are provided for separating the stator between two respective grooves. Form-wound coils each with two legs are inserted or laid in the grooves. Form-wound coils are known in themselves and correspond to a conductive material wound in several windings, the form of which comprises two legs each with several electrical conductors, wherein the electrical conductors are connected together at a first end and a second end which may for example also be called the head region and foot region. A form-wound coil accordingly has two electrical connections.

The legs of each form-wound coil are arranged in different grooves. Several grooves each hold at least two legs of different form-wound coils, and at least the grooves adjacent to the separating points hold a maximum of one leg of a form-wound coil.

It is accepted here that the form-wound coils are not arranged completely evenly in the circumferential direction in the generator stator, but as a result, separation and/or assembly of the generator stator at the separating points is easily possible. Thus firstly, simple separation of the stator for transport is guaranteed, but also rapid reassembly of the transported stator for operation.

According to an embodiment, the form-wound coils are dual layer form-wound coils.

According to one embodiment of the generator stator, the form-wound coils are each arranged in the grooves such that in the circumferential direction, five grooves are arranged between the grooves which hold the legs of a form-wound coil. This allows a six-phase, or 2×3-phase stator.

According to an alternative embodiment, the form-wound coils are each arranged in the grooves such that in the circumferential direction, four grooves are arranged between the grooves which hold the legs of a form-wound coil.

According to a further embodiment, in the circumferential direction, six grooves before and six grooves after a separating point hold a maximum of one leg of the form-wound coil.

Provided is a generator, which is preferably a synchronous generator. The generator has a rotor according to one of the preceding embodiments, and a stator, in particular according to one of the preceding embodiments.

According to one embodiment of the generator, the generator stator has one or more dividing regions, which may also be called separating regions, for dividing the generator stator into two or more stator segments. Thus the entire generator can easily be transported.

Provided is a wind power plant with a wind power plant tower on which a nacelle is arranged, with a generator according to one of the preceding embodiments. The wind power plant also comprises an aerodynamic rotor with several rotor blades for driving the generator.

Provided is a method for transporting a generator of a wind power plant, namely preferably a generator rotor according to one of the preceding embodiments and/or a generator stator according to one of the preceding embodiments. According to the method, for transport to an erection site, the rotor is divided into at least two segments along at least one dividing plane. The dividing planes extend in the rotor along asymmetrical section lines of the rotor.

According to a further embodiment of the method, the segments of the generator rotor are connected before being divided for transport, and a first segment, which has an opening delimited circumferentially by the first segment, is connected to a bearing. For transport, the bearing remains connected to the first segment.

According to a further embodiment of the method, the stator is also separated at its separating points for transport. Thus not only the generator rotor but also the generator stator can be transported on public roads.

According to a further embodiment of the method, for transport, before division at its separating points, form-wound coils are inserted in the generator stator. The form-wound coils are inserted in circumferentially adjacent grooves. The legs of each form-wound coil lie in different grooves, and several grooves hold at least two legs of different form-wound coils, and at least the grooves adjacent to the separating points hold a maximum of one leg of a form-wound coil.

Thus simple separation at the separating points is possible for transporting the stator, since no form-wound coils need be removed here.

According to a further embodiment of the method, after transport, the generator is assembled and operated exclusively with the form-wound coils which were inserted in the stator before transport. Accordingly, no further form-wound coils or other coils need additionally be inserted in the region of the separating points after transport. Thus there is no need to connect the coils in the region of the separating points, and rapid assembly of the generator at the erection site is possible.

BRIEF DESCRIPTION OF THE SEVERAL VIEWS OF THE DRAWINGS

Further embodiments arise from the exemplary embodiments shown in figures.

The figures show:

FIG. 3 a diagrammatic depiction of a generator stator,

FIG. 4 a further diagrammatic depiction of a generator stator,

DETAILED DESCRIPTION

Figure 1:
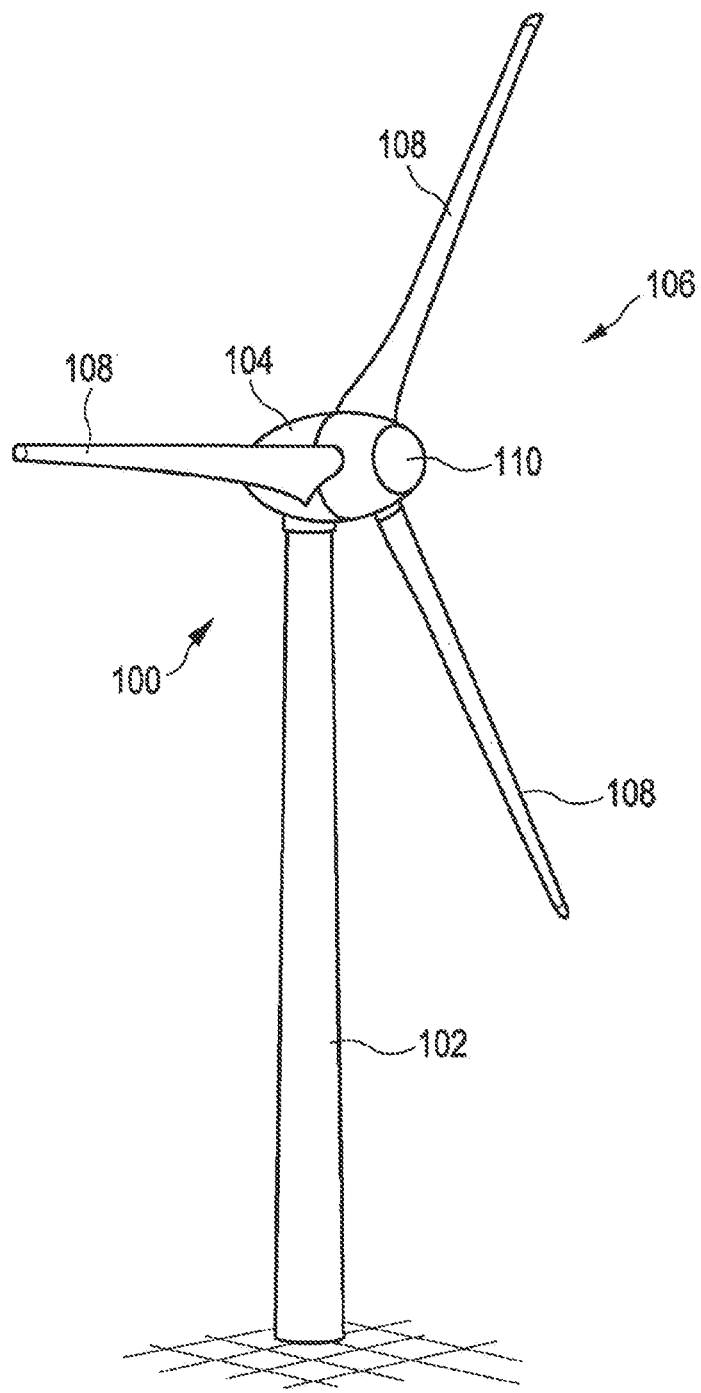
FIG. 1 a wind power plant.

FIG. 1 shows a diagrammatic depiction of a wind power plant 100 according to the invention. The wind power plant 100 has a tower 102 and a nacelle 104 on the tower 102. An aerodynamic rotor 106 with three rotor blades 108 and a spinner 110 is provided on the nacelle 104. The aerodynamic rotor 106 is set in a rotational motion by the wind during operation of the wind power plant, and thus also turns an electro-dynamic rotor of the generator which is coupled directly or indirectly to the aerodynamic rotor 106. The electrical generator is arranged in the nacelle 104 and generates electrical energy. The pitch angles of the rotor blades 108 can be changed by pitch motors at the rotor blade roots 108*b* of the respective rotor blades 108.

Figure 2:
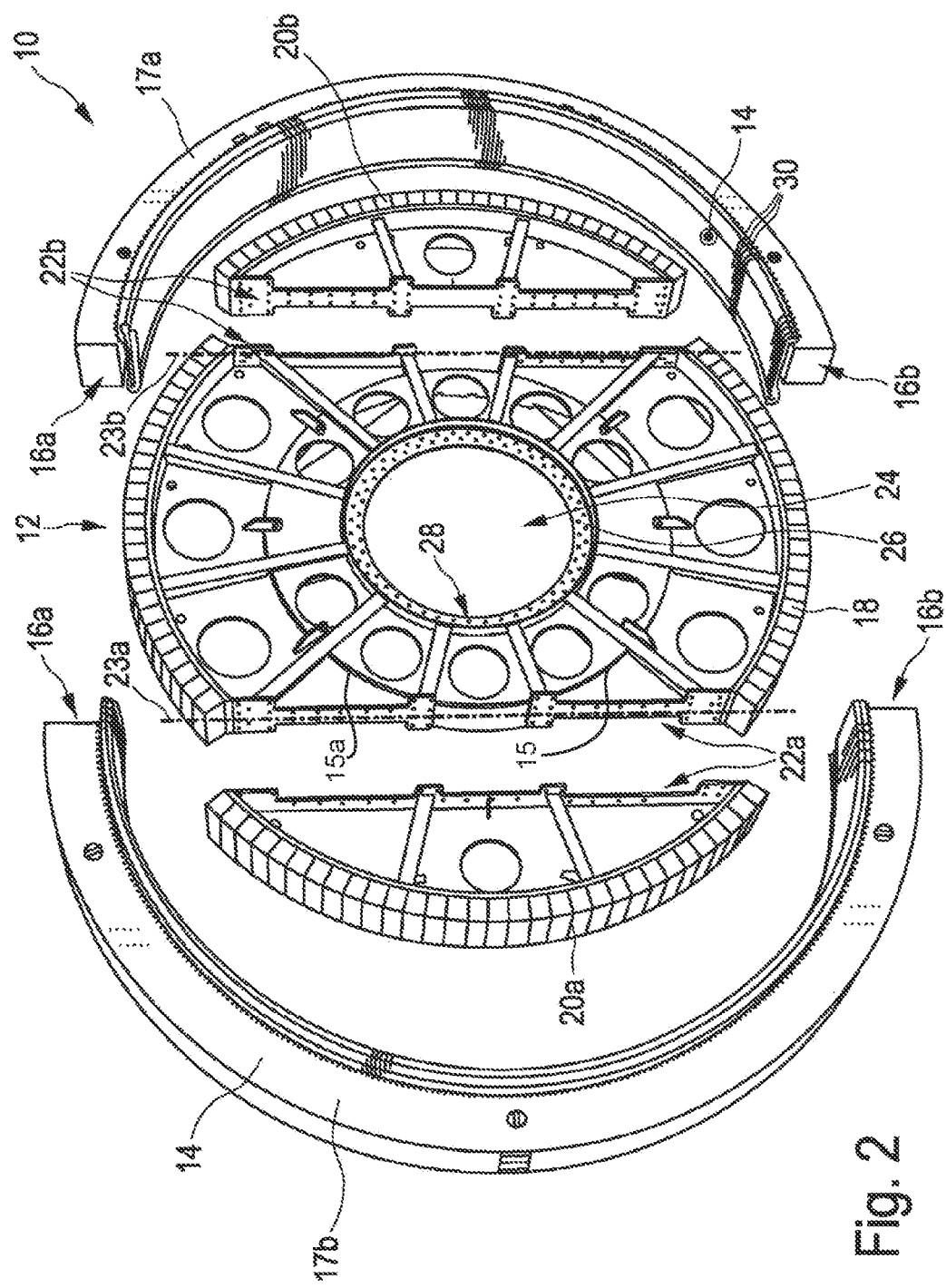
FIG. 2 a generator.

FIG. 2 shows a generator 10 according to a first exemplary embodiment of the invention. The generator 10 comprises a generator rotor 12, which is here depicted according to a first exemplary embodiment of the invention, and a generator stator 14, which is depicted according to a first exemplary embodiment. The generator stator 14 has two separating points 16*a*, 16*b* at which the generator stator 14 is split into two generator stator parts 17*a*, 17*b* for clearer depiction. The generator stator 14 is thus divided into two halves.

In comparison, the generator rotor 12 is divided into a first segment 18, referred to below as the central segment, and two further segments 20*a*, 20*b*. For this, the generator rotor 12 has two dividing planes 22*a*, 22*b*. The dividing planes 22*a*, 22*b* extend along asymmetrical section lines 23*a*, 23*b* of the generator rotor 12.

The generator rotor 12 also has an opening 24. The opening 24 comprises a circumferential circular ring 26, which is here visibly provided with drilling holes 28 in order to connect a bearing to the circumferential circular ring 26. Accordingly, the segments 18, 20*a*, 20*b* of the generator rotor 12 can be separated for transport after a trial run on a test bench, without the bearing arranged in the region of the opening 24 having to be removed.

Since the generator rotor 12 only has pole shoes with direct current windings, for assembly of the generator 10, it is necessary merely to create the electrical connections of the further segments 20*a*, 20*b* to the first segment 18, after the further segments 20*a*, 20*b* have been mechanically connected to the first segment 18 after transport.

The generator stator 14 however has form-wound coils 30 which are inserted in the grooves (not shown) of the generator stator 14. FIG. 2 shows the form-wound coils merely as examples, wherein the arrangement of the form-wound coils 30 in the generator stator 14 is explained in more detail below with references to FIGS. 3 and 4. Accordingly, FIG. 3 shows a cross-section through a generator stator part 17*a*, 17*b* of the generator stator 14 shown in FIG. 2. The separating points 16*a*, 16*b* are depicted. For greater clarity, the generator stator 14 is shown unwound.

The generator stator 14 has grooves 32 which are filled by the legs 34 of the form-wound coils 30. Again, the number of grooves 32 shown is smaller than the number of grooves of a real generator stator part 17*a*, 17*b*, or a half of the generator stator 14 shown in FIG. 2. This depiction is however selected here merely as an example for greater clarity. It is evident that the grooves 32 in the region of the separating points 16*a*, 16*b* are filled only by a single leg 34 of a form-wound coil 30. Accordingly, only the coils 30 in the middle region 36 are each filled with two legs 34 of different coils 30, whereas the six grooves 32 each lying in a region 38 to either side of a separating point 16*a*, 16*b* are filled with a maximum of one leg 34 of a form-wound coil 30. As an example, only the pole shoe 40 of the generator rotor 12 is shown.

FIG. 4 shows an alternative allocation of the grooves 32 of the generator stator part 17*a*, 17*b* with two separating points 16*a*, 16*b*. Here in addition, the twelve grooves 32 lying centrally in the region 42 are filled with maximum one leg 34 of a form-wound coil 30. The remainder of the grooves 32 in region 42 then remains empty.

Figure 5:
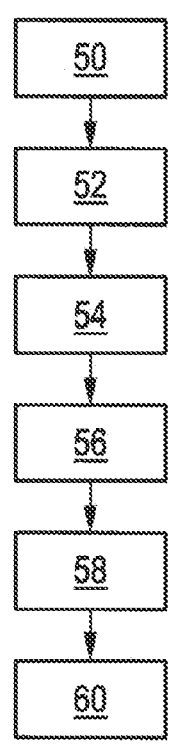
FIG. 5 the steps of a method for transporting a generator rotor.

FIG. 5 shows the steps of the sequence of a method for transporting a generator 10 according to one exemplary embodiment. In a step 50, the generator 10 is fully assembled. In particular, for complete assembly, the generator rotor 12 is composed from its segments 18, 20*a*, 20*b*, and the stator 14 is joined together at its separating points 16*a*, 16*b*. A bearing is connected to the circumferential circular ring 26 of the opening 24 of the generator rotor 12. This serves for testing the generator on a test bench in an optional step 52. In particular, fine adjustments are made in step 52.

Then in step 54, the generator 12 is divided into segments 18, 20*a*, 20*b* only in the region of the dividing planes 22*a*, 22*b*. The generator stator 14 is also separated into generator stator parts 17a, 17b at its separating points 16a, 16b. Segments 18, 20a, 20b of the generator rotor 12 and the halves of the generator stator 14 are loaded and transported in a step 56. In particular, the bearing connected with the circumferential circular ring 26 remains connected to the first segment 18 of the generator rotor 12. In step 58, after transport, the segments 18, 20a, 20b of the generator rotor 12 are connected together, and the generator stator 14 is again assembled at its separating points 16a, 16b. In step 60, the generator 10 is operated without further form-wound coils 30 being inserted in the generator stator 14 in addition to those which were already inserted in the generator stator 14 during transport.

Figure 6:
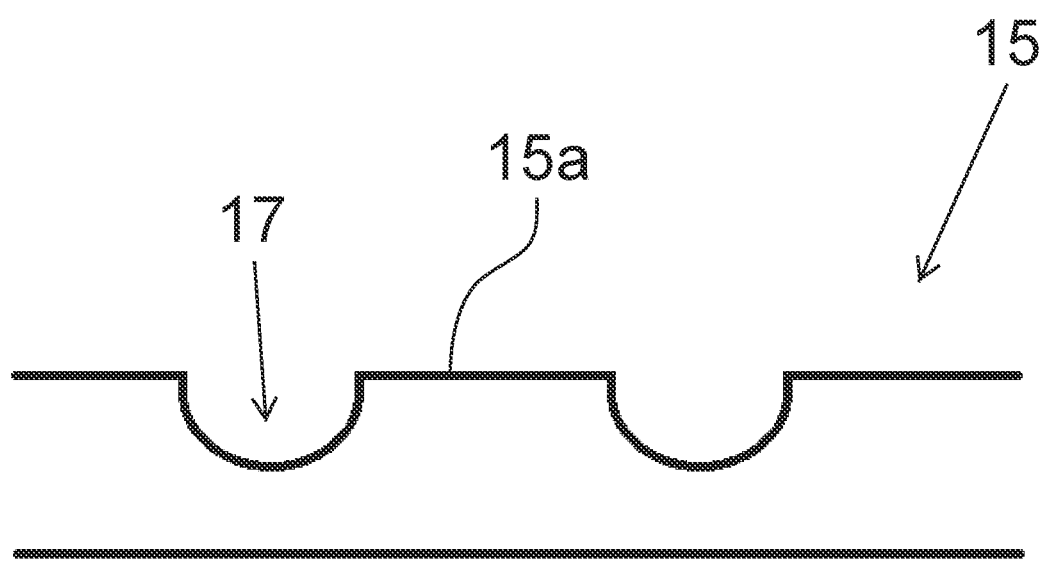
FIG. 6 a close up of a portion of the annular region of the first segment.

According to a further embodiment, the first segment has an annular region 15 (see FIGS. 2 and 6) which is arranged parallel to the rotational plane of the rotor. With reference to FIG. 6, the annular region 15 comprises a braking surface 15a for braking the rotor and/or one or more locking recesses 17 for locking the rotor. Due to the annular region arranged on the first segment for braking and/or locking the rotor, it is not necessary to provide further regions for braking and/or locking on the further segments which are different from the first segment, so no transitions between locking or braking regions occur at dividing planes, which would otherwise have to be taken into account on alignment of the segments at the erection site.

The invention claimed is:

1. A generator rotor for a wind power plant, the generator rotor comprising:
   one or more dividing planes that divide the generator rotor into at least two segments, wherein the one or more dividing planes extend in the generator rotor along asymmetrical section lines of the generator rotor,
   wherein a first segment of the at least two segments has an opening configured to receive a bearing, wherein the bearing is delimited circumferentially by the first segment, and
   wherein the first segment has a circular region arranged parallel to the rotational plane of the generator rotor, wherein the circular region comprises a braking surface configured to brake the generator rotor and one or more locking recesses configured to lock the generator rotor.

2. The generator rotor as claimed in claim 1, wherein the first segment has a circumferential circular ring at the opening, wherein the circumferential circular ring is configured to be connected to the bearing for rotatable mounting of the generator rotor on a rotor axis.

3. The generator rotor as claimed in claim 1, wherein at least one segment of the at least two segments has a contour of a circle segment.

4. The generator rotor as claimed in claim 1, wherein the one or more dividing planes is two dividing planes, wherein the two dividing plans are parallel to each other, and wherein the generator rotor is configured to be divided by the two dividing planes into three segments, wherein at least two of the three segments have a contour of a circle segment.

5. The generator rotor as claimed in claim 1, wherein the generator rotor has a diameter of more than 6 meters, wherein each of the at least two segments in one dimension are each equal to or less than 5 meters.

6. The generator rotor as claimed in claim 1, wherein the generator rotor is an internal rotor and is externally excited.

7. A synchronous generator, comprising:
   the generator rotor as claimed in claim 1, and
   a generator stator.

8. The synchronous generator as claimed in claim 7, wherein the generator stator has one or more separating points.

9. A wind power plant comprising:
   a wind power plant tower,
   a nacelle arranged on the wind power plant tower,
   the synchronous generator as claimed in claim 7, and
   an aerodynamic rotor with a plurality of rotor blades configured to drive the synchronous generator.

10. A method, comprising:
    dividing the generator rotor as claimed in claim 1 into the at least first and second segments along the one or more dividing planes, and
    transporting the at least first and second segments of the generator rotor to an erection site.

11. The method as claimed in claim 10, wherein the first segment of the generator rotor has an opening delimited circumferentially by the first segment, wherein the first segment is connected to the bearing before being divided, and wherein the bearing remains connected to the first segment while being transported.

12. The method as claimed in claim 10, further comprising separating a generator stator at separating points, and transporting the separated generator stator.

13. The method as claimed in claim 12, wherein form-wound coils are inserted in the generator stator prior to separating the generator stator, wherein the form-wound coils are inserted in circumferentially adjacent grooves so that legs of each form-wound coil lie in different grooves, and a first set of grooves each hold at least two legs of different form-wound coils, and at least the grooves adjacent to the separating points hold a maximum of one leg of a form-wound coil.

14. The method as claimed in claim 13, further comprising building a wind power plant that includes the generator rotor and the generator stator, wherein the generator stator is operated exclusively with form-wound coils that were inserted in the generator stator before transport.

* * * * *